March 3, 1959 — D. F. SAURENMAN ET AL — 2,876,413
BOREHOLE APPARATUS
Filed March 30, 1954

INVENTORS
DEAN F. SAURENMAN
MAURICE P. LEBOURG
BY
THEIR ATTORNEY

2,876,413

BOREHOLE APPARATUS

Dean F. Saurenman and Maurice P. Lebourg, Houston, Tex., assignors, by mesne assignments, to Schlumberger Well Surveying Corporation, Houston, Tex., a corporation of Texas Application March 30, 1954, Serial No. 419,678

11 Claims. (Cl. 324—10)

The present invention relates to borehole apparatus and more particularly to new and improved apparatus for maintaining equipment pressed against the wall of a borehole while passing therethrough.

In recent years several well logging tools have been developed which require that measurements be made from an instrument pressed against the wall of a borehole while the tool is being passed through the hole. Examples of such tools are to be found in H. G. Doll Patent No. 2,669,690, issued February 16, 1954, for "Resistivity Method for Obtaining Indications of Permeable Formations Traversed by a Borehole," and in H. G. Doll applications Serial No. 214,273, filed March 7, 1951, for "Electrical Logging of Earth Formations Traversed by a Borehole," now Patent No. 2,712,629, Serial No. 248,620, filed September 27, 1951, for "Differential Pressure Well Logging," now Patent No. 2,747,402, and Serial No. 359,361, filed June 3, 1953, for "Spontaneous Potential Well Logging Method and Apparatus," now Patent No. 2,713,146, and in J. Tittman application Serial No. 325,582, filed December 12, 1952, for "Neutron Logging Method and Apparatus," now Patent No. 2,778,951. During the logging portion of an operation with tools in the above category it is desirable that the measuring instrument be maintained continuously against the borehole wall at a predetermined orientation with respect to longitudinal axis of the borehole regardless of variations in the diameter of the borehole. Further, to prevent excessive wear on the instrument, and to decrease the rig-time for a given operation by increasing the speed at which the tool may be passed through the borehole, it is desirable that the instrument be retracted away from the wall except during the actual logging portion of an operation.

It is a primary object of the present invention, accordingly, to provide new and improved apparatus for maintaining an instrument continuously against the wall of a borehole at a predetermined orientation with respect to the longitudinal axis thereof while the apparatus is being passed through the hole, regardless of variations in the diameter of the borehole.

Another object of the present invention is to provide new and improved apparatus of the above type in which the instrument may be selectively expanded against and retracted from the wall of the borehole.

These and other objects of the invention are attained by providing a measuring instrument which is normally retracted against an elongated carrier and which has a predetermined orientation with respect to the longitudinal axis of said carrier. The instrument is mechanically coupled to the carrier by means of two support arms which are respectively pivotally mounted on both the carrier and the instrument. The four pivot points, two of which are on the carrier and two of which are on the instrument, are arranged to define a parallelogram. By applying pressure to this arrangement, the instrument is forced away from the carrier but will maintain the predetermined orientation with respect to the longitudinal axis of the carrier as a result of the parallelogram arrangement of the pivot points. Thus, regardless of borehole diameter variations, the instrument will be maintained against the wall of the borehole at the desired orientation with respect to the carrier and with respect to the borehole since the carrier will generally remain with a predetermined orientation relative to the axis of the borehole while passing therethrough. In addition, by employing remotely controllable, reversible motive means for applying the pressure, the instrument may be forced against the wall and retracted at the will of the operator.

Preferably the support arms are parallel to each other and when extended, form an acute angle with respect to the longitudinal axis of the carrier such that the pressure exerted on the instrument by the wall of the bore hole tends to retract the arms when the tool is passing in a predetermined direction through the hole. Also, the pressure from the remotely controllable, reversible motive means is preferably applied directly to the support arms in order to control the position of the instrument suspended by such arms. In addition, it is preferable that back-up means be similarly arranged against the opposite side of the carrier, such that both the instrument and the back-up means operate to expand and retract simultaneously, to assure a positive connection with the wall of the borehole. The back-up means may be in the form of an additional measuring instrument, if desired.

These and other objects of the invention will be more fully understood with reference to the accompanying drawings in which.

Figures 1, 2, 3, 4:
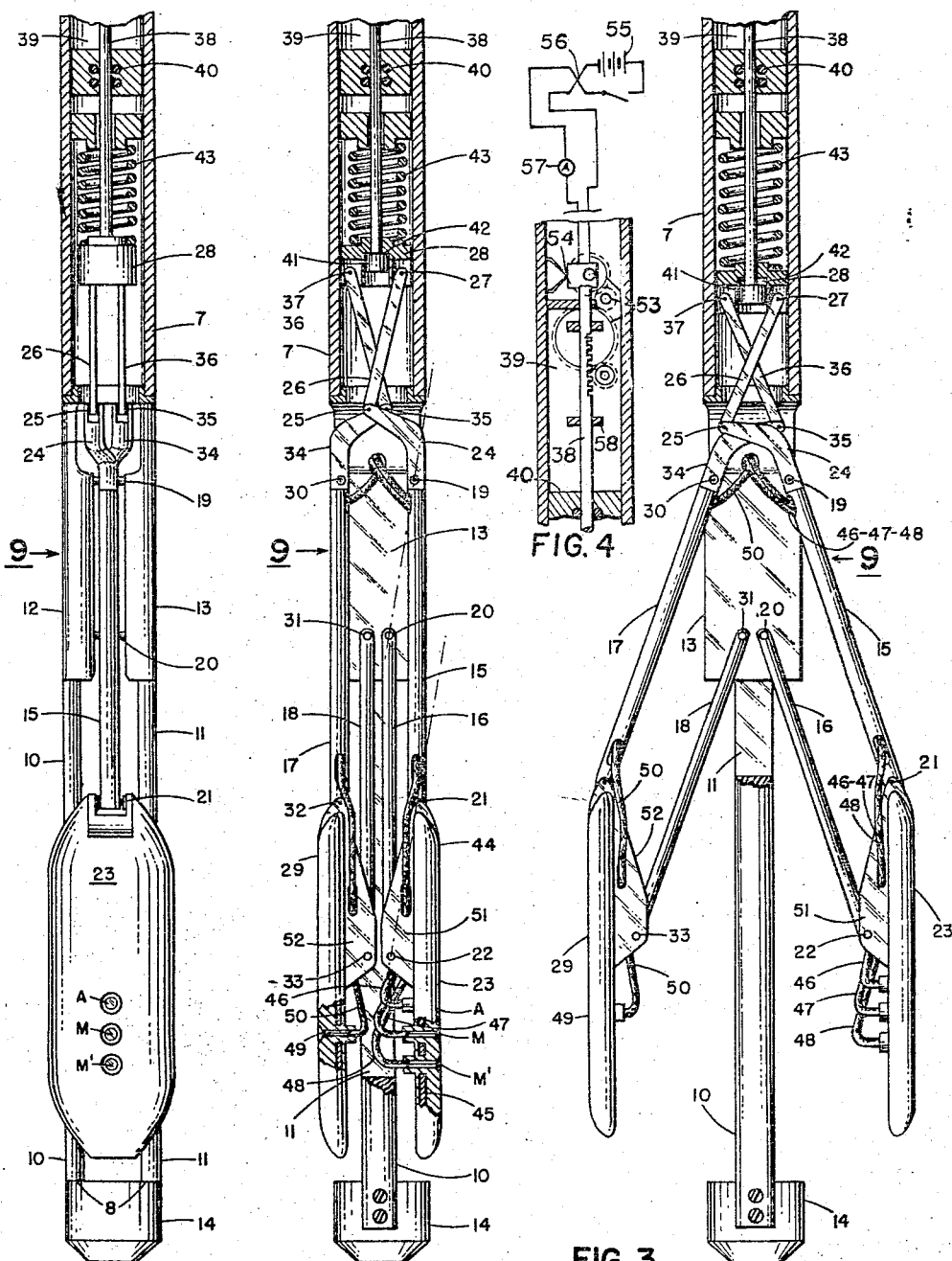
Fig. 1 is a front view, partially in section, of a typical well tool, in retracted position, constructed in accordance with the invention.
Fig. 2 is a side view, also partially in section, of the tool shown in Fig. 1.
Fig. 3 is a view of the tool as shown in Fig. 2, when in extended position.
Fig. 4 shows schematically a typical motive means for activating a well tool constructed in accordance with the invention.

In Figs. 1 and 2 are shown two views of a typical well tool 9 constructed in accordance with the present invention, in position for passing quickly through a borehole prior to or upon completion of the measuring or logging portion of an operation. In this retracted position, all laterally extendible portions of the tool are maintained inwardly against a mounting frame 8, which may comprise lower parallel rod members 10 and 11 coupled respectively to upper parallel support members 12 and 13. Mounting frame 8 is connected at its base to a rounded bottom nose 14 and at its uppermost portion to cylindrical housing 7. By this arrangement rod members 10 and 11, and support members 12 and 13 are sufficiently separated to allow the laterally extendible support arms 15 and 16 to fit snugly therebetween when in the retracted position and not to block movement of arms 15 and 16 in a lateral direction.

Support arms 15 and 16 are respectively pivotally connected by means of pins 19 and 20, between parallel support members 12 and 13. Additionally, support arms 15 and 16 are respectively pivotally connected to a measuring instrument 23 by means of pins 21 and 22. The pins 19, 20, 21, and 22 are arranged to define a parallelogram. Thus the distance 19—20 is equal to the distance 21—22, and the distance 19—21 equals the distance 20—22. Further, the angle between the line defined by pins 19—20 and the longitudinal axis of tool 9 is equal to the angle between the line defined by the pins 21—22 and the same axis. Instrument 23 has a fixed orientation with respect to line 21—22 and thus with respect to the longitudinal axis of tool 9.

The upper portion 24 of arm 15 beyond pin 19 extends inwardly at an angle such that pin 25 at the top thereof is displaced from the axis defined by pins 19 and 21. A linkage member 26 is pivotally connected by pin 25 to arm 15 and by pin 27 to a driving member 28 in cylindrical housing 7. It can be seen that when driving member 28 is forced downwardly, linkage member 26 exerts pressure on pin 25, and pin 19 acts as a fulcrum for support arm 15, support portion 24 supplying leverage tending to force arm 15 away from frame 8.

Preferably a back-up means 29 is arranged diametrically opposite instrument 23 and connected by arms 17 and 18, and pins 30, 31, 32 and 33 to support members 12 and 13 identically as instrument 23. The angular upper portion 34 of arm 17 is pivotally connected by pin 35 to linkage member 36, in turn pivotally connected by pin 37 to driving member 28.

A rod member 38, extending from a pressure-balanced housing 39 through pressure sealed opening 40 in cylindrical housing 7 through driving member 28, is normally locked so as to maintain member 28 in its most upward position, by means of an expanded portion 41 fitting in a corresponding opening 42 in member 28. A compression spring 43 between driving member 28 and the top of housing 7 tends to force driving member 28 downwardly. As shown in Fig. 4, within pressure-balanced housing 39 rod member 28 is connected through a suitable gear train 53 to an electrical motor 54 for retracting rod member 38, which additionally supplies the locking action for maintaining rod member 38 in its upward position against the pressure of spring 43.

In operation with the instrument 23 and back-up means 29 locked against frame 8, and arms 15, 16, 17 and 18 retracted between frame members 10 and 11, 12 and 13, by means of rod member 38, tool 9 may be passed speedily through the bore hole by means of a conventional electric cable, not shown, to the lowermost portion of that section of the well to be logged. By an appropriate electrical circuit, the operator at the surface then releases rod member 38 so that it no longer exerts any retaining action on driving member 28. This may be accomplished for example by passing direct current from source 55 of a polarity selected by switch 56, through motor 54 until meter 57 indicates that stop 58 is fully downward. Compression spring 43 then forces member 28 and linkages 26 and 36 downwardly, applying pressure on angular portions 24 and 34 of support arms 15 and 17, respectively. As shown in Fig. 3, arms 15 and 17 are thereby extended from frame 8 until instrument 23 and back-up means 29 are pressed against the wall of the borehole. Of course, arms 16 and 18 are also extended from frame 18. As a result of the parallelogram arrangements of pins 19, 20, 21 and 22, and of pins 30, 31, 32 and 33, instrument 23 and back-up means 29 will maintain constant orientations with respect to the longitudinal axis of tool 9 regardless of their distance therefrom.

Accordingly, the tool 9 may now be raised through the borehole, and instrument 23 and back-up means 29 will remain against the well wall regardless of diameter variations, as a result of the continuous pressure exerted by compression spring 43. In addition, the instrument 23 and back-up means 29 will maintain their predetermined orientation even with such changes in diameter, as a result of the parallelogram arrangement of the aforementioned pins.

The variations in diameter may be recorded if desired.

When measurements have been obtained from the desired section of the well, the operator starts the electric motor 54 in housing 39 but in the reversed direction by reversing the polarity of current flow by means of switch 56, and rod member 38 withdraws driving member upwardly, thereby retracting arms 15, 16, 17 and 18, instrument 23, and back-up means 29. When the fully retracted position shown in Figs. 1 and 2 is reached, rod 38 is again locked, and tool 9 is ready to be speedily withdrawn from the well or moved to another location for making additional measurements along another section in the same well.

Instrument 23 may be given any desired orientation with respect to tool 9 and any desired form. For example, any of the instruments suggested in the aforementioned patents and applications may be employed as instrument 23. For convenience in making simultaneous measurements, back-up means 29 may also comprise a measuring instrument, for example, any of the aforementioned types, though usually different from instrument 23.

As shown in the drawing, instrument 23 may be designed in accordance with the principles set forth in the aforementioned Patent No. 2,669,690. Thus a pad portion 44 constructed of flexible insulating material is supported along its center by steel frame 45. In the face of pad 44 are three electrodes A, M and M' connected by suitable insulated electrical conductors 46, 47 and 48, respectively, to surface equipment. Instrument 29 may be a similar pad, having an electrode 49 connected by insulated conductor 50 to the surface of the earth, as described in the aforementioned application Serial No. 359,361. With these instruments, it is preferable that the pads 23 and 29 be maintained parallel with the axis of tool 9. Thus the flange members 51 and 52 are provided to allow the instruments to make the desired angles with pin lines 21—22, and 32—33.

In order to keep the electrical conductors from undue strain and from becoming fouled in the equipment, such conductors as 46, 47 and 48, and 50, preferably pass through the interiors of support arms 15 and 17, respectively, and thence through the upper portion of the tool 9 into the electric cable.

Many modifications will occur to those skilled in the art, and, accordingly, the appended claims are to be accorded their full range of equivalents.

We claim:

1. Borehole apparatus comprising carrier means adapted to pass through a borehole, instrument means, a first support member pivotally connected to said carrier means at a first location and to said instrument means at a second location, a second support member pivotally connected to said carrier means at a third location and to said instrument means at a fourth location, and resilient means for forcing said instrument means away from said carrier means and against the wall of said borehole, said four locations defining the four corners of a parallelogram, whereby said support members maintain said instrument means against the wall of said borehole in a predetermined orientation with respect to said carrier means as said carrier means passes through said borehole.

2. Borehole apparatus comprising carrier means adapted to pass through a borehole, instrument means, a first support member pivotally connected to said carrier means at a first location and to said instrument means at a second location, a second support member pivotally connected to said carrier means at a third location and to said instrument means at a fourth location, and resilient means for forcing said instrument means away from said carrier means and against the wall of said borehole, said four locations defining the four corners of a parallelogram and the line defined by said first and second locations being parallel to the line defined by said third and fourth locations, whereby said support members maintain said instrument means against the wall of said borehole in a predetermined orientation with respect to said carrier means as said carrier means passes through said borehole.

3. Borehole apparatus comprising carrier means adapted to pass through a borehole, instrument means normally maintained against said carrier means, wall-engaging means movably mounted on said carrier means diametrically opposite said instrument means and normally maintained against said carrier means, a first support member pivotally connected to said carrier means at a first location and to said instrument means at a second location, a second support member pivotally connected to said carrier means at a third location and to said instrument means at a fourth location, and resilient means controllable from the surface of the earth for forcing said instrument means and said wall-engaging means away from said carrier means and against the wall of the borehole, said four locations defining the four corners of a parallelogram and the line defined by said first and second locations being parallel to the line defined by said third and fourth locations, whereby said support members maintain said instrument means against the wall of said borehole in a predetermined orientation with respect to said carrier means as said carrier means passes through said borehole.

4. Borehole apparatus comprising carrier means adapted to pass through a borehole, means for lowering and raising said carrier means through said borehole, first and second diametrically opposite instrument means normally maintained against said carrier means, a first support member pivotally connected to said carrier means at a first location and to said first instrument means at a second location, a second support member pivotally connected to said carrier means at a third location and to said first instrument means at a fourth location, a third support member pivotally connected to said carrier means at a fifth location and to said second instrument means at a sixth location, a fourth support member pivotally connected to said carrier means at a seventh location and to said second instrument means at an eighth location, and resilient means controllable from the surface of the earth for forcing said first and second instrument means against the wall of the borehole, means for retracting said first and second instrument means, the four locations on said first and second support members and the four locations on the second and third support members respectively defining the four corners of parallelograms, the line defined by said first and second locations being parallel to the line defined by said third and fourth locations and the line defined by said fifth and sixth locations being parallel to the line defined by said seventh and eighth locations, whereby said support members maintain said first and second instrument means against the wall of said borehole in respective predetermined orientations with respect to said carrier means while said carrier means is passed through said borehole.

5. Borehole apparatus for selectively maintaining a measuring instrument against the wall of a borehole while the instrument is being passed through the borehole comprising elongated carrier means adapted to pass through a borehole, means for lowering and raising said carrier means through said borehole, measuring instrument means mounted on a housing normally maintained against one side of said carrier means, wall-engaging means normally maintained against another side of carrier means diametrically opposite said one side, whereby said carrier means, said instrument means, said housing and said wall-engaging means may be passed readily through said borehole, a first support arm pivotally connected to said carrier means at a first location on said carrier means above said instrument means and pivotally coupled to said housing at a second location, a second support arm parallel to said first support arm pivotally connected to said carrier means at a third location above said instrument means but below said first location and pivotally connected to said housing at a fourth location, said four locations defining the four corners of a parallelogram and the line defined by said second and fourth locations on said housing making a predetermined angle with an axis of said instrument means, supporting means pivotally connected to said carrier means above said instrument means and pivotally connected to said wall-engaging means, resilient means controllable from the surface of the earth for forcing said housing and said wall-engaging means away from said carrier means and against the wall of the borehole, whereby said instrument means is maintained substantially against the wall of the borehole at a predetermined orientation with respect to said carrier means while said carrier means is being raised through a selected portion of said borehole, and means controllable from the surface of the earth for retracting said housing and said wall-engaging means against said carrier means.

6. Borehole apparatus as in claim 5 wherein said supporting means comprises a third support arm pivotally connected to said carrier means at a fifth location horizontally opposite said first location and pivotally connected to said wall-engaging means at a sixth location, and a fourth support arm parallel to said third support arm pivotally connected to said carrier means at a seventh location horizontally opposite said third location and pivotally connected to said wall-engaging means at an eighth location, the four locations on said third and fourth support arms defining the four corners of a parallelogram and the line defined by said sixth and eighth locations on said wall-engaging means making a predetermined angle with an axis of said wall-engaging means, whereby said wall-engaging means is maintained at a predetermined orientation with respect to said carrier means.

7. Borehole apparatus as in claim 6 wherein said elongated carrier means is at least partially hollow, and said first, third, fifth and seventh locations are located internally thereof, the line defined by said first and third locations and the line defined by fifth and seventh locations making acute angles with the vertical axis of said elongated carrier means, whereby said four support arms are substantially internal of said carrier means when said housing and said wall-engaging means are fully retracted against said carrier means.

8. Borehole apparatus as in claim 7 wherein said resilient means for focing said housing and said wall-engaging means away from said carrier means and against the wall of the borehole comprises first and second lever means respectively connected to said first and third support arms above said first and fifth locations, normally retained compression spring means mounted in said carrier means tending to act on said lever means to force said first and third support arms outwardly from said carrier means, and means controllable from the surface of the earth for releasing said normally retained compression spring means, and wherein said means for retracting said housing and said wall-engaging means against said carrier means comprises motor means mounted in said carrier means and controllable from the surface of the earth, means coupling said motor means to said lever means, whereby said motor means retracts said support arms when activated from the surface of the earth.

9. Borehole apparatus comprising carrier means adapted to pass through a borehole, instrument means, a first support member connected for pivotal movement to said carrier means at a first location and to said instrument means at a second location, a second support member connected for pivotal movement to said carrier means at a third location and to said instrument means at a fourth location, and means for biasing said instrument means away from said carrier means and against the wall of said borehole, said four locations defining substantially the four corners of a parallelogram, whereby said support members maintain said instrument means against the wall of said borehole in an essentially predetermined orientation with respect to said carrier means.

10. Borehole apparatus comprising carrier means adapted to pass through a borehole, instrument means, a first support member connected for pivotal movement to said carrier means at a first location and to said instrument means at a second location, a second support member connected for pivotal movement to said carrier means at a third location and to said instrument means at a fourth location, and means for driving said instrument means away from said carrier means and against the wall of said borehole, said four locations defining substantially the four corners of a parallelogram, and one of said second and said fourth locations being disposed substantially centrally relative to said instrument means.

11. Borehole apparatus comprising carrier means having a vertical axis adapted to pass through a borehole, instrument means, first and second support members connected to said carrier means for pivotal movement at two locations spaced from one another substantially in the direction of said vertical axis and connected to said instrument means for pivotal movement at two locations, defining together with said first-mentioned two locations substantially the four corners of a parallelogram, and means coupled to said carrier means and to one of said support members for biasing said instrument means away from said carrier means.

References Cited in the file of this patent

UNITED STATES PATENTS

| | | |
|---|---|---|
| Re. 23,621 | Hildebrandt | Feb. 24, 1953 |
| 1,880,218 | Simmons | Oct. 4, 1932 |
| 2,030,244 | Cox | Feb. 11, 1936 |
| 2,267,110 | Kinley | Dec. 23, 1941 |
| 2,669,690 | Doll | Feb. 16, 1954 |